United States Patent
Bhatia

[11] Patent Number: 5,599,900
[45] Date of Patent: Feb. 4, 1997

[54] POLYESTERS PRODUCTION PROCESS

[75] Inventor: Kamlesh K. Bhatia, Newark, Del.

[73] Assignee: E. I. Du Pont de Nemours and Company, Wilmington, Del.

[21] Appl. No.: 632,994

[22] Filed: Apr. 16, 1996

Related U.S. Application Data

[63] Continuation-in-part of Ser. No. 438,299, May 10, 1995, Pat. No. 5,552,513, which is a continuation-in-part of Ser. No. 138,312, Oct. 18, 1993, Pat. No. 5,434,239.

[51] Int. Cl.⁶ .................................................. C08F 6/00
[52] U.S. Cl. .................... 528/491; 528/272; 528/274; 528/279; 528/283; 528/285; 528/308.3; 528/308.6; 528/481; 528/489; 528/492; 528/503; 525/437; 525/444
[58] Field of Search .................... 528/272, 274, 528/279, 283, 285, 308.3, 308.6, 481, 489, 491, 492, 503; 525/437, 444

[56] References Cited

U.S. PATENT DOCUMENTS

| | | | |
|---|---|---|---|
| 2,578,660 | 12/1951 | Auspos et al. | 528/276 |
| 2,647,885 | 8/1953 | Billica | 528/285 |
| 2,789,972 | 4/1957 | Reynolds et al. | 528/370 |
| 2,973,341 | 2/1961 | Hippe et al. | 526/65 |
| 3,110,547 | 11/1963 | Emmert | 264/211.17 |
| 3,390,135 | 6/1968 | Seiner | 526/64 |
| 3,469,618 | 9/1969 | Siclari et al. | 159/48.2 |
| 3,545,520 | 12/1970 | Siclari et al. | 159/4.04 |
| 3,594,356 | 7/1971 | Hinton | 528/483 |
| 4,835,293 | 5/1989 | Bhatia | 549/274 |

*Primary Examiner*—Samuel A. Acquah

[57] ABSTRACT

An atmospheric pressure process for the continuous production of polyester is disclosed wherein a melt of bis(3-hydroxy propyl) terephthalate, or its low molecular oligomers, obtained by esterifying terephthalic acid or transesterifying dimethyl terephthalate with propylene glycol, is intimately contacted with an inert gas to facilitate polymerization and removal of the reaction byproducts. The propylene glycol evolved and the inert gas are recycled.

26 Claims, 1 Drawing Sheet

POLYESTERS PRODUCTION PROCESS

This is a continuation-in-part of U.S. Ser. No. 08/438,299, filed on May 10, 1995, now U.S. Pat. No. 5,552,513 which is a continuation-in-part of U.S. Ser. No. 08/138,312, filed on Oct. 18, 1993, now U.S. Pat. No. 5,434,239.

FIELD OF THE INVENTION

An improved process for the production of polyesters at atmospheric pressure is disclosed.

TECHNICAL BACKGROUND

Polyester production from terephthalic acid (TPA) or its esters, such as dimethyl terephthalate (DMT), and glycols is known. This has been accomplished by stage-wise melt polymerization of the dihydroxy ester of the bifunctional carboxylic acid, or low molecular weight oligomers thereof, under successively higher vacuum conditions. In order for the polymerization to continue to the degree needed for most commercial applications, the condensation by-products, especially the glycols, must be removed from the reaction system at vacuums as high as 1–3 mm Hg. Such processes require costly high vacuum equipment, multistage steam jets to create the vacuum, and $N_2$ purged seals and flanges to minimize leakage of air into the system. Condensate from the steam jets and organic by-products from the system end up as a waste water stream that requires treatment and contributes to volatile organic emissions to the air. The present invention provides a less costly polymerization process that can be carried out at atmospheric pressure and in a closed loop configuration that eliminates volatile organic emissions and the waste water discharge.

Atmospheric pressure processes to conduct polymerization, without employing vacuum and using an inert gas, have been disclosed in the prior art, but these have several drawbacks.

U.S. Pat. No. 2,973,341 (Hippe) discloses a continuous process for the production of polyester condensate and an improved continuous process for making polyethylene terephthalate from dimethyl terephthalate and ethylene glycol. The process employs liquid dimethyl terephthalate and mixes with it ethylene glycol, in an excess molar ratio of 1.5:1, to form a liquid reaction mixture in a first stage below the transesterification temperature and then carrying the liquid reaction mixture through three separate temperature controlled stages. Transesterification occurs in the second stage at a temperature of not more than 197° C.; vaporous reaction products are removed in the third stage at 197° C. to 230° C. by passing an inert gas through the liquid reaction mixture; polycondensation occurs in the fourth stage at 230° C. to 255° C. for a period of time sufficient to produce a filament forming polyethylene terephthalate condensate while again passing an inert gas through the liquid reaction mixture. Ethylene glycol by-product can be recovered from the fourth stage and recycled to the second stage of the reaction.

U.S. Pat. No. 3,545,520 (Siclari et al.) discloses an apparatus for stripping substances and lightweight fractions from polymers including a means for introducing an inert gas counter current to the polymeric material with the consequent increase in viscosity of the polymers. The apparatus permits recycling a portion of the material removed from the vessel so that the material can be recycled into the reaction container.

U.S. Pat. No. 3,469,618 (Siclari et al.) discloses a method for stripping off volatile fractions from polyamides and polyesters involving feeding material in the form of droplets or liquid threads though an inert gaseous atmosphere, while recirculating that atmosphere.

U.S. Pat. No. 3,110,547 (Emmert) discloses a process for preparing a linear condensation polyester. In one embodiment of the invention, the polymer is extruded downwardly through a chamber while passing a current of inert gas, such as nitrogen, through the reaction vessel at a rate sufficient to keep the glycol partial pressure below 2 mm Hg while maintaining a temperature between 300° C. and 400° C. in order to rapidly finish the polymer by converting the polymer having a degree of polymerization of from about 15° to 35° to a finished polymer with a degree of polymerization of about 70°.

U.S. Pat. No. 3,390,135 (Seiner) discloses a continuous polyesterification process by direct esterification of dicarboxylic acids and polyhydric alcohols, and contacting the reaction product with a nonreactive gas to remove the water of esterification.

U.S. Pat. No. 3,480,587 (Porter) discloses a polyester preparation process in which a lower molecular weight prepolymer is polymerized by conducting polycondensation in narrow tubes under conditions of turbannular flow achieved with an inert gas medium flowing cocurrently at high velocities.

French A, 239,649 (Bayer) discloses a continuous process for preparing polybutylene terephthalate wherein monoesters or low viscosity polybutylene terephthalate is polymerized by cocurrently transporting it with a heated inert gas in the form of two phase annular flow through a long, narrow, helical tube of 3 to 100 nm (0.1 to 3.9 inch) diameter in which the inert gas flows in a velocity of 20–300 m/s (equal to 66 to 984 ft/second).

European Patent A, 0,182,351 (Mitsubishi) discloses a polyester process in which the ester or its oligomer is polymerized in the form of fine, 0.015 to 0.5 mm particles sprayed into an inert gas stream.

U.S. Pat. No. 5,064,935 (Jackson et al.) discloses a continuous process for preparing polybutylene terephthalate oligomer or prepolymer for feeding into a conventional polycondensation for PBT polymer. The prepolymer is prepared by feeding the reaction mass from a prior transesterification step into the top of a countercurrent column reactor through which a heated inert gas is passed upward by introducing it at the bottom.

The processes disclosed above, however, suffer from one or more drawbacks such as (1) only a low molecular weight oligomer or a prepolymer is produced; (2) the quantity of inert gas used is very large to be economical; (3) the reactor size might be too large to be feasible for commercial scale operation; (4) the inert gas employed is not recycled in a closed loop to eliminate emissions; (5) a prepolymer of sufficiently high molecular weight is required to achieve high molecular weight polyester required for commercial application; (6) inert gas velocities employed are too high to be feasible for commercial scale production or a high pressure is required. Because of such drawbacks, the processes presently practiced for commercial production of polyester continue to be conducted under high vacuum as described above.

The object of the present invention is to provide an improved atmospheric pressure process for continuous or batchwise production of polyesters, especially poly(alkylene terephthalates), particularly poly(propylene terephthalate), and poly(butylene terephthalate) of high molecular weight.

SUMMARY OF THE INVENTION

The invention relates to an atmospheric pressure method of polymerizing a dihydroxy ester of a bifunctional carboxylic acid, or of a low molecular weight polymerizable oligomer thereof, to a product with a high degree of polymerization (DP), preferably in the presence of a polyester polymerization catalyst, wherein by-products of the polymerization are removed from the system by means of an inert gas. This higher degree of polymerization is useful in fibers, films and other commercial applications.

This process provides an improved method for producing linear aromatic polyesters, especially poly(propylene terephthalate) and poly(butylene terephthalate) referred to herein as PPT and PBT, respectively. The bifunctional acid in the production of PPT is terephthalic acid (TPA). The process involves the production of poly(propylene terephthalate) from terephthalic acid (TPA) and propylene glycol (PG), also known as 1,3-propanediol, by esterification, or from dimethyl terephthalate (DMT) and propylene glycol by a transesterification stage, followed by polycondensation. The process is conducted at atmospheric pressure or above, thereby avoiding high vacuum equipment and eliminating possible air contamination that causes product decomposition and gel formation. The process comprises the following steps:

(a) esterifying terephthalic acid (TPA) or transesterifying dimethyl terephthalate (DMT) with propylene glycol to produce dihydroxy propyl terephthalate or its low molecular oligomers, and (b) intimately contacting the dihydroxy propyl terephthalate or its low molecular weight oligomers in melt form with an inert gas flowing at a velocity of 0.2 to 3 ft/sec, such that the interfacial area between the melt and the gas phase is at least about 20 ft$^2$/ft$^3$ of the melt, and removing the volatile reaction by-products with the inert gas wherein the polymerization is complete in less than about 5 hours, preferably less than 3 hours, of contact time while the reactants are kept at a suitable temperature to maintain them in the melt form so as to produce polypropylene terephthalate.

The above processes are preferably conducted in the presence of a polyester polymerization catalyst. However, a catalyst is not needed for the esterification step (a) if the starting material is terephthalic acid.

In a preferred embodiment of the invention, a single stream of inert gas is recycled through a polymer finishing stage, a polycondensation stage and a stage wherein propylene glycol is recovered for reuse in the process.

The process for the production of PBT is similar to that described above for PPT except that the glycol employed is 1,4-butane diol (BD). For PBT production, it is preferred that the starting material is DMT. The acid end group present in the reaction mass, if TPA is used, catalyze cyclizationn of BD to tetrahydrofuran (THF).

DETAILED DESCRIPTION OF THE INVENTION

Figure 1:
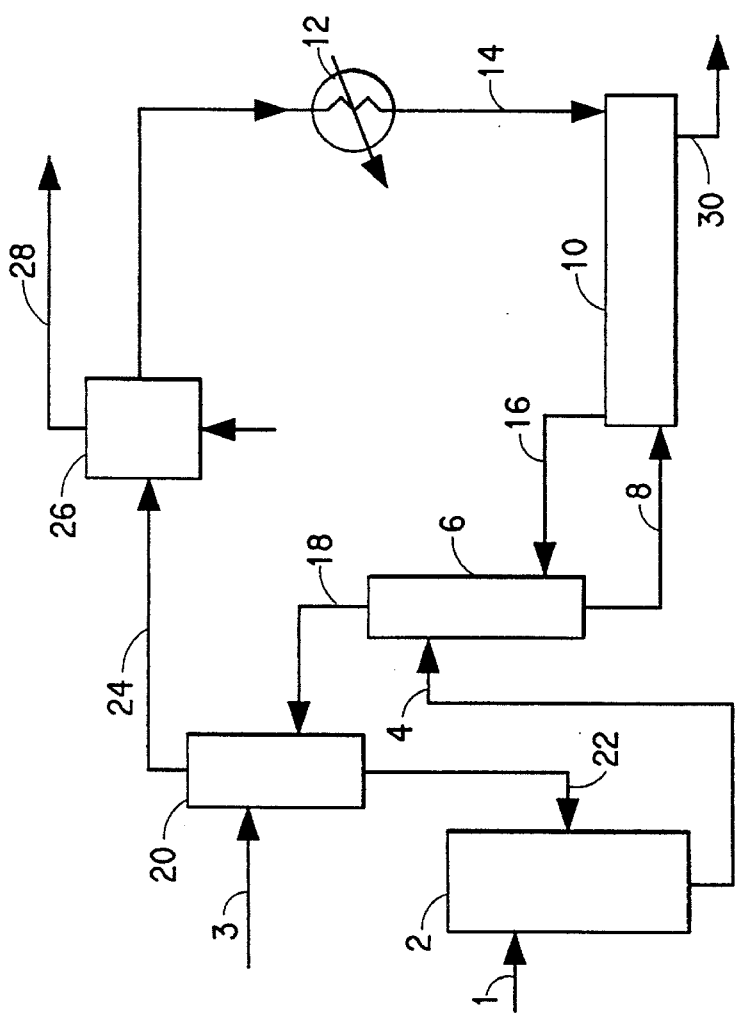
FIG. 1 is diagrammatic flow sheet for one continuous process of the invention.

The polymerization step can be carried out in one vessel or more than one physically distinct vessel in series, wherein the reaction mass is polycondensed to some degree of polymerization in one vessel and then transferred to another vessel for further polymerization. This choice is based on mechanical considerations related to handling of the polymeric melt as its viscosity increases sharply as the degree of polyermizatlon increases, heat input requirements to volatilize the by-products of polycondensation and cost.

The above processes may be carried out batchwise or continuously. Batchwise production may be preferred for preparing specialty polymers when the production required is not very large and strict quality control is required particularly with respect to additives. For large scale production for commodity applications, such as staple and yarn, it is more cost effective to carry out the above steps continuously wherein the reactants are fed substantially continuously into the processing vessels and the products are removed substantially continuously. The rates of feed and product removal are coordinated to maintain a substantially steady quantity of the reactants in the reaction vessels while the inert gas flows countercurrently to the flow of the melt.

If two or more vessels are employed in series for conducting the polycondensation, it is preferred that a single stream of inert gas is employed that flows countercurrently to the flow of the melt in the process, i.e., the inert gas leaving a final stage of polymerization is led through the preceding stage and finally through a stage wherein the glycol is recovered for reuse and the inert gas is recycled back to the final stage of polymerization.

Poly(propylene terephthalate) or (PPT) is manufactured in this process by first reacting terephthalic acid (TPA) or dimethyl terephthalate (DMT) with propylene glycol (PG). If DMT is the starting material, a suitable transesterification catalyst such as zinc acetate or titanium alkanoate is used for the reaction. Esterified DMT/TPA is polymerized as a melt at atmospheric pressure or above by intimately contacting the melt with a stream of inert gas (for example, but not limited to, $N_2$ or $CO_2$) to remove the condensation by-products, mainly, propylene glycol. Preferably, the inert gas is preheated to about polymerization temperature or above, prior to its introduction into the polymerization equipment. It is preferred that the inert gas velocity through the polymerization equipment be in the range of 0.2 to 3 ft/sec, most preferably 0.3 to 1.5 ft/sec. The vapor leaving the polymerization (containing the propylene glycol removed) is treated to recover the propylene glycol for recycle to the esterification stage or for other uses. The inert gas stream is then cleaned up and recycled. Thus, the overall process operates as a closed loop system which avoids environmental pollution and integrates propylene glycol recovery and its recycle into the process.

The quantity of inert gas flow should be sufficient to carry the propylene glycol to be removed at a partial pressure of propylene glycol below the equilibrium partial pressure of propylene glycol with the reaction mass at the operating temperature. The operating temperature during polycondensation is maintained sufficiently high so as to keep the reaction mass in a molten state. Preferably the temperature range is about 230° C. to 250° C. to reach the high molecular weight polymer. The polymerization equipment is designed so that the interfacial area between the melt and the inert gas is at least 20 square feet, preferably at least about 30 square feet, per cubic foot of the melt and that this surface area is renewed frequently. Under these process conditions, the high degree of polymerization useful for fibers and films can be achieved in less than 5 hours of residence time, and preferably in less than 3 hours of residence time.

To produce good quality product of the desired high degree of polymerization, the polymerization should be completed in a reasonably short period such as less than 5 hours, preferably less than about 3 hours. The polymerization is considered completed when the degree of polymerization (DP) desired for a particular application is achieved. For most common applications, such as fibers, the DP should be at least 50, preferably at least 60, and most preferably at least 70. By "degree of polymerization" is meant the number average degree of polymerization. Exposure of the polymeric melt to high operating temperatures for prolonged period causes chain cleavage and decomposition reactions with the result that the product is discolored and a high degree of polymerization is not achieved. If the inert gas velocities are too low, polymerization takes longer. If the velocity is too high it can lead to entrainment of the reaction mass in the gas. In a continuous mode of operating, high inert gas velocities in a countercurrent direction can also hinder the flow of the melt through the equipment. Also, higher velocities may require larger quantities of gas flow without substantially increasing the effectiveness of polymerization. It has been found that the polymerization can be carried out effectively at 0.2 to 3 ft/sec velocities.

The quantity of inert gas flow employed to remove the propylene glycol that evolves is sufficiently high so that the partial pressure of propylene glycol in the gas, at any point in the process, is well below the equilibrium partial pressure of propylene glycol with the melt at this point. Larger quantities of gas flow generally increase the rate of polymerization but the increase is not proportionately greater. Therefore, very large amounts of gas are not usually necessary or desirable as large quantities increase the size of recycling equipment and the cost. Very large quantities may also require larger size polymerization equipment in order to keep the gas velocity in the 0.2 to 3 ft/sec range.

In the continuous embodiment of this invention, the inert gas flows countercurrently to the flow of the molten reaction mass at a velocity of at least 0.2 ft/sec, preferably at least about 0.3 ft/sec. The countercurrent flow reduces the quantity of inert gas required to achieve effective polymerization. The $N_2$ flow, however, should be at least 0.2 lbs/lb of polymer (equivalent to 1.5 moles of inert gas per mole of polymer repeat unit). Larger quantities of gas flow may however be needed to obtain the preferred gas velocities.

In the process of this invention, the reactant is kept in a molten state, i.e., above its melting point which is about 225° C. for the high molecular weight (high DP) polymer. The melting point is lower at the lower DP's and a lower temperature range such as 180° to 225° may be used at those DP's. At temperatures much above 260° C., decomposition reactions cause product discoloration which interferes with the quality of the product. The reaction mass should preferably be maintained at about 180° C. to about 260° C., more preferably between 230° to 250° C.

For the polycondensation to continue, propylene glycol generated must be removed from the reaction mass by the inert gas. This removal is facilitated if there is a high interfacial area between the melt and the gas phase. To complete the polymerization in a reasonably short period, the surface area should be at least about 20 ft²/ft³ of the melt, preferably at least about 30 ft²/ft³ of the melt. A higher surface area is preferred to increase the rate of polymerization. The reaction equipment for contacting the melt and the inert gas should also be designed to frequently renew the interfacial area and mix the polymer melt. This is particularly important as the degree of polymerization increases and the melt becomes very viscous. When the DP of the melt is low, it is quite fluid and the surface area requirements are easily met by simply passing the insert gas through the melt as bubbles, but at higher DP's, e.g., above 45 the melt is quite viscous and surface area generation and renewal is preferably achieved by mechanical means that make the melt spread into films, mix the melt films and regenerate such films.

The rate of polymerization can be increased by using a suitable polymerization catalyst, particularly where a high interfacial area is provided for inert gas—melt contact. The increase in the overall rate, however, is not proportional to the concentration of catalyst as the removal of propylene glycol starts to limit the overall polymerization.

The catalyst also increases the rates of decomposition reactions. An effective concentration of catalyst for a set of reaction conditions, such as temperature, gas flow, velocity and surface area, is such that it gives the most enhancement in the rate of polymerization without substantial decomposition. The optimum concentration of catalysts of various species can be determined by experimentation. It would generally be in the range of a few parts per million parts of the polymer, such as about 5–300 parts per million.

Catalysts for facilitating the polymerization are any one or more polyester polymerization catalysts known in the prior art to catalyze such polymerization processes, such as, but not limited to, compounds of antimony, germanium, tin and titanium. Such metals which may be introduced, for convenience, as alkanoates solubilized in propylene glycol. Examples of such catalysts are found in U.S. Pat. No. 2,578,660, U.S. Pat. No. 2,647,885 and U.S. Pat. No. 2,789,772, which are incorporated herein by reference.

Various dihydroxy esters of bifunctional carboxylic acids may be used in the processes described herein. These are monomeric compounds that can polymerize to a polymer. Examples of such compounds are bis(2-hydroxyethyl) terephthalate, bis (3-hydroxypropyl) terephthalate, bis (4-hydroxybutyl) terephthalate, bis (2-hydroxyethyl) naphthalenedioate, bis (2-hydroxyethyl) isophthalate, bis [2-(2-hydroxyethoxy) ethyl] terephthalate, bis [2-(2-hydroxyethoxy) ethyl] isophthalate, bis [(4-hydroxymethylcyclohexyl)methyl] terephthalate, bis [(4-hydroxymethylcyclohexyl)methyl] isophthalate, and a combination of such monomers and their oligomers. Mixtures of these monomers and oligomers may also be used to produce copolymers.

By a "polymerizable oligomer" is meant any oligomeric material which can polymerize to a polyester. This oligomer may contain low molecular weight polyester, and varying amounts of monomer. For example, the reaction of dimethyl terephthalate or terephthalic acid with propylene glycol, when carried out to remove methyl ester or carboxylic groups usually yields a mixture of bis (3-hydroxypropyl) terephthalate, low molecular weight polymers (oligomers) of bis(3-hydroxypropyl) terephthalate and oligomers of mono(3-hydroxypropyl) terephthalate (which contains carbonyl groups). This type of material is referred to herein as "polymerizable oligomer".

The process may be used to produce various polyesters such as poly(ethylene terephthalate), poly (1,3-propylene terephthalate), poly (1,4-butylene terephthalate), poly(ethylene naphthalenedioate), poly(ethylene isophthalate), poly(3-oxa-1,5-pentadiyl terephthalate), poly (3-oxa-1,5-pentadiyl isophthalate), poly[1,4-bis (oxymethyl)cyclohexyl terephthalate] and poly [1,4-bis(oxymethyl)cyclohexyl isophthalate]. Poly(ethylene terephthalate), poly(propylene terephthalate) and poly(butylene terephthalate) are especially important commercial products.

The process avoids high vacuum polymerization processes characteristic of the conventional art. Advantages of the process are a simpler flow pattern, lower operating costs and the avoidance of steam jets, hot wells and atmosphere emissions. The process also has environmental advantages due to the elimination of volatile organic emissions and waste water discharge. Furthermore, polymerization is conducted in an inert environment. Therefore, there is less decomposition and gel formation which results in better product quality. Propylene glycol and inert gas (e.g., $N_2$ or $CO_2$) are recycled continuously. The process is described in FIG. 1.

FIG. 1 is a diagrammatic flow sheet for the continuous process of the invention. Reactant materials TPA or its dimethyl ester, DMT (1) and propylene glycol (22) are supplied continuously to an esterification reactor (2) for esterification (or transesterification) to dihydroxypropyl terephthalate and its low DP oligomers. The resulting esterified or transesterified product is an oligomer with a low degree of polymerization (DP). The resulting DP is from 1–3 if the starting material is DMT. If TPA is the starting material, the resulting oligomer usually has a higher DP. The molten reaction product formed in the esterification reactor (2) is conducted through transfer line (4) to a prepolymerization column (6) for polycondensation. A suitable polyester polymerization catalyst, such as a titanate, may be added at this point. Additives, such as $TiO_2$, which is usually added to polyester as a delustrant for fibers, may also be added at this point. Other materials to optimize the polymerization rate are also introduced as this point. For example, if TPA is the starting material for esterification the oligomer from reactor 2 may contain too many carboxyl end groups; some propylene glycol (could be a portion of the propylene glycol recovered later in the process from the inert gas) may be added to balance the end groups to optimize the reaction rate and enable polymerization to the desired high degree. On the other hand, if DMT is the starting material for esterification, a small amount of TPA may be added to increase the overall rate of polymerization. The prepolymer, exiting the esterification column with a degree of polymerization from 15–30, is conducted through transfer line (8) to finisher (10) in order to finish the polymer by raising the degree of polymerization to about 50° to about 150°, preferably about 60° to about 120° and more preferably about 70° to about 90°. The finisher (10) is maintained at a temperature greater than about 225° C. but not too high to cause polymer decomposition. A temperature range of about 230° C. to 250° C. is preferred. The polymerization product is continuously removed from the finisher through line (30). An inert gas, preferably nitrogen, is heated in heater (12) at a temperature of from about 230° C. to 260° C. and is introduced through line (14) into the finisher to flow counter current to the direction of polymer flow in order to remove volatile reaction by-products, primarily propylene glycol. The inert gas flows through the finisher (10) and then through line (16) to prepolymerization column (6) removing volatile reaction by-products, which are mainly propylene glycol, in that reaction column. The hot inert gas stream containing organic vapors, which are mainly propylene glycol with minor amounts of methanol, water, and some thermal decomposition products, exits the prepolymerization column through line (18) and enters the glycol recovery system (20) where glycol is recovered from the stream by scrubbing it with the fresh propylene glycol feed (3) to the process, thereby also recovering the heat from the hot stream in line 18. The recovered glycol is recycled to the esterification reactor (2) through line (22). The inert gas stream containing the uncondensed volatile organics exits the glycol recovery system through line (24) and enters a clean up system (26).

The clean up system may be an adsorption bed (26), such as an activated carbon bed, wherein the organic volatiles are adsorbed producing a clean nitrogen stream which can be heated and returned to the finisher (10). Thus, the nitrogen is employed in a closed loop and all processing equipment is operated at atmospheric pressure (or above, as is necessary to ensure the flow of nitrogen through the equipment in the loop). The inert gas flowing in the polymerization equipment (6) and (10) has a velocity of between about 0.2 to 3 ft/sec, preferably 0.3 to 1.5 ft/sec. The quantity of inert gas introduced into the system is sufficient so that the partial pressure of the by-products is maintained below the equilibrium pressure of the byproducts with the melt in order to provide for the continuous polymerization. The quantity of inert gas may be as small as about 0.5 pounds for each pound of polyethylene terephalate produced. The adsorption bed (26) can be purged to remove the adsorbed products. The adsorbed products are transferred by line (28) to a combustion device, such as a boiler, (not shown) where they are converted to carbon dioxide and water by combustion thus completing an environmentally clean, emissions free process. The clean up system may also be a catalytic coverter that converts the organics to $CO_2$.

An embodiment of the present invention that further simplifies the continuous process described above comprises completing the polycondensation of the esterification oligomer to the final polyester product of high degree of polymerization in one vessel. The oligomer formed in the esterification reaction (2) is conducted directly to the finishing polymerizer (10) thereby the prepolymerization column (6) is eliminated. The inert gas leaving (10) is then fed to the glycol recovery column (20), is processed as described above and recycled. This embodiment is particularly suitable for polymerizing oligomers of about 5 DP or higher such as those generally obtained when TPA is used as the starting material for esterification.

In one embodiment of the process of this invention, propylene glycol flow to the recovery scrubber (2) and other conditions may be adjusted such that the glycol leaving the scrubber is sufficiently hot so as to substantially glycolize any low molecular weight oligomers or entrained prepolymer that might enter the scrubber (2) in small amounts with the inert gas leaving the polymerization equipment.

Alternatively, or in conjunction with the operation of scrubber (2) as described, the inert gas may be contacted with sufficient quantities of cold propylene glycol so that the inert gas leaving the glycol recovery step is cooled down to about the ambient temperature or colder. In this embodiment of the process, minor amounts of low boiling components such as methanol, water, or volatile from decomposition products, if any present in the inert gas, are also substantially removed with the cold propylene glycol stream, and it is not necessary to have the clean up system (26).

In another embodiment of this invention, a fractionating column is used instead of the recovery scrubber (2). This allows recovery of the glycol as well as its refining prior to recycle without need for additional external heat.

Figure 2:
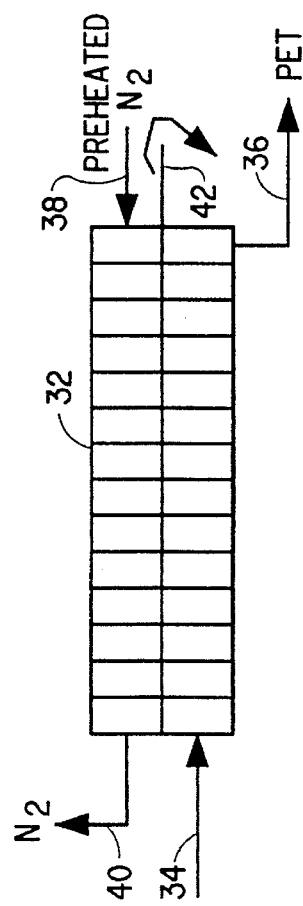
FIG. 2 represents one apparatus which is suitable for carrying out the polymerization of the invention, wherein material having a lower degree of polymerization is converted to material having a high degree of polymerization.

FIG. 2 illustrates one apparatus which is suitable for carrying out the polymerization of the invention particularly for use with the high viscosity material and degree of polymerization encountered in the finisher (10) of FIG. 1. It consists of a horizontal, agitated cylindrical vessel (32). The esterified DMT or TPA, or a low molecular weight oligomer thereof, is continuously introduced as stream (34) at one end of the vessel (32) and a preheated inert gas, such as nitrogen, is continuously introduced as stream (38) at the other end, so as to provide a counter current flow to the polymer flow. The nitrogen stream (38) carrying reaction by-product vapors, mostly propylene glycol, leaves as stream (40). The polymerized product, poly(propylene terephthalate), is removed as stream (36). The flow rates of streams (34) and (36) are coordinated to be equivalent to each other and controlled so as to provide the desired hold up of the melt in the finisher, usually about equivalent to 1 to 2 hours times the flow rate, which is equivalent to a melt level at about ¼ to ⅓ the height of the vessel. The quantity of nitrogen introduced into the system is sufficient so that the partial pressure of the evolving reaction by-products is maintained at less than the equilibrium pressure of the by-products with the, for example, poly(propylene terephthalate) melt, so as to provide adequate driving force to remove propylene glycol from the melt into the gas stream. The diameter of the vessel is designed so that the superficial velocity of the inert gas stream is about 0.3 to 1.5 ft/sec.

The vessel is equipped with an agitator (42) which can be rotated at a controlled speed. The mechanical design of the agitator is such that (a) the walls of the vessel are wiped;

(b) a large interfacial area of at least 20 $ft^2/ft^3$ of the melt preferably greater then 30 $ft^2/ft^3$ of the melt is created;

(c) the surface area is renewed frequently; and (d) good radial mixing is provided.

One design which achieves the above specified criteria, is a rotating disc and donut contactor comprising several alternating discs and donuts. The inert gas flows through the center of the donuts then flows radially towards the wall of the vessel in the space between the donut and the next disc, then around the disc towards the center of the next donut and so on. The discs and donuts are sized such that the velocity of gas through such passages does not exceed 5 ft/sec, and is preferably less than about 3 ft/sec. For a continuous polymerizer it is preferred that the discs and donuts are spaced closer near the end where the oligomer or the prepolymer is fed, the spacing is increased gradually or incrementally along the length of the cylinder so as to accommodate free downward flow of the reaction melt from the agitator elements as its viscosity increases. The spacing may be as close as ¼ inch near the feed end but preferably 1 inch or greater near the product discharge end where the viscosity of the melt is the highest.

The process of this invention may also be carried out for batchwise preparation of polyesters wherein a batch of low molecular weight oligomer (prepared in a separate vessel or in the polymerizer) is charged to the polymerization equipment and contacted with the inert gas as described until the desired high degree of polymerization is achieved. The oligomer is prepared by esterification as described except that it may also be prepared batchwise either in a separate vessel or in the polymerization vessel itself. The gas and melt contacting equipment may be similar to that described for the continuous embodiment of this invention. For the final stages of polymerization, equipment similar to that of FIG. 2 may be used except that the discs and donuts are spaced uniformly. For batchwise preparation it is advantageous to adjust the speed of the agitator as the viscosity of the melt increases. Initially, when the viscosity is low, the agitator may operate at as high as 100 rpm but toward the completion of polymerization a low speed of about 1 to 20 rpm, preferably about 2–12 rpm is desirable. Batchwise production is suitable for economic reasons when relatively small quantities of polyester are to be prepared or when a strict control of additives concentrations is required for product quality considerations. When the quantities to be prepared are very small, it may be more economical to not provide equipment for recycling the inert gas, or the propylene glycol, and discharge it to the atmosphere after rendering it harmless to the environment by known methods such as scrubbing it thoroughly with water and disposing off the water in an environmentally safe manner.

The invention can also be conducted in a semibatch fashion wherein the polymerization equipment is fed intermittently, reaction mass is polymerized to a higher degree, and the product is discharged intermittently.

EXAMPLE 1

Polymerization of a low molecular weight oligomer of bis(3-hydroxy propyl) terephthalate, having a degree of polymerization (DP) of about 3, was conducted in a 15 mm diameter test tube heated to the polymerization temperature by placing it in a temperature controlled tube furnace. The test tube was equipped with means to introduce preheated $N_2$ at a controlled rate near the bottom and an outlet was created near the top of the test tube to allow $N_2$ to exit. A thermocouple was placed in the test tube to monitor and control temperature of the reaction mass. A 5 g sample of the oligomer was placed in the tube. The oligomer had been prepared by transesterifying DMT with propylene glycol and contained 24 ppm titanium as a titanate catalyst.

The temperature was ramped from 120° to 245° C. over a 20 to 25 minute period while $N_2$ was bubbled through the reaction mass as a superficial gas velocity of 1 to 1.2 ft/sec. This allowed the initial polymerization to occur at lower temperatures. No carry over of the low DP oligomers into the $N_2$ stream was observed. $N_2$ was introduced below the melt causing the melt to lift up and allowing it to fall along the tube walls to create interfacial area (estimated as >30 $ft^2/ft^3$), and provide surface renewal and good mixing. During the 25 minute period, the melt became quite viscous. The experiment was continued for another 10 minutes at 245° C. (the actual temperature fluctuated between 235° and 250° C.) while the $N_2$ velocity was increased to about 2 ft/sec so as to push the more viscous melt up the walls of the tube to create surface area. The melt became very viscous indicating effective polymerization.

The experiment was continued for another 10 minutes while the $N_2$ velocity was raised to 2.7 to 3 ft/sec. The melt had however become so viscous that effective bubbling, and surface area generation was not possible. The experiment was then stopped and the resulting polymer was analyzed for molecular weight distribution by GPC. The melt had a good polydispersity of 1.8 vs. the theoretical 2.0. The number average degree of polymerization (DP) calculated from the GPC data was 68°.

The experiment showed that initial polymerization can be easily achieved by bubbling the $N_2$ through the reaction mass, but at higher DP's it would be more effective to generate surface area by mechanical means.

EXAMPLE 2

The same monomer was used in Example 1 was polymerized in a laboratory apparatus of the type shown in FIG. 2 which was constructed to provide surface area by mechanical means.

The apparatus consisted of a 5-¼" glass tube with an inside diameter of about 1" which was held in a horizontal position. The tube was fitted with an agitator consisting of two ¼ wide aluminum strips that substantially spanned the length of the tube and were held 180 degrees apart by two small strips attached at the two ends to form a rectangular shape frame of slightly smaller width than the diameter of the tube. The agitator was rotated by use of a motor with a variable speed gear reducer. The agitator provided mixing, surface renewal and wiping of the inside walls of the tube. A thermocouple was inserted into the tube from each of its two ends to monitor and control the temperature of the reaction mass.

The tube was filled with 25 gms of the oligomer and heated with a heating tape wrapped around it. Also preheated $N_2$ at about 125° C. was passed through the tube at a velocity of 0.25 ft/sec. As the oligomer heated up and started to melt, the agitator was started at a slow speed.

When the temperature reached 110° to 125° C. the reaction mass was completely molten and condensation products started to evolve and get carried by the $N_2$. As the temperature increased further to 150° C., the evolution was faster. Also, it was observed that the evolution of condensation by-products was faster as the agitator speed was increased. The speed was increased to 45 rpm. After about 30 minutes, the melt was still very fluid and not being spread by the agitator onto the walls of the tube, indicating that the surface generation was not very effective. It is estimated that the surface area generated was only about 15 to 20 $ft^2/ft^3$ of the melt. The experiment was continued for about another 30 minutes during which the $N_2$ inlet temperature had increased to about 173° C. and the melt temperature was increased to about 182° to 199° C. and the agitator rpm was increased to 100. During this period the melt became viscous enough to be picked by the agitator and spread on the surface of the tube. The experiment was continued for another 30 minutes during which the $N_2$ inlet temperature was raised to 220°–240° C., the melt temperature increased to 225° to 250° C. and $N_2$ velocity was increased to about 1 ft/sec. The reaction mass started to get viscous and was spreading approximately ¾ the way up the circumference of the tube. It is estimated that the surface being generated was about 50 $ft^2/ft^3$ of the melt. During this last 30 minute period the melt became quite viscous and the apparatus was shut down. The resulting product was analyzed by GPC as in Example 1. The polydispersity was 1.8 and the number average DP was 64. Higher DP's would have resulted if the experiment had been continued for a longer period.

What is claimed is:

1. A process for preparing poly(propylene terephthalate) of at least a degree of polymerization of 50, by polymerizing bis(3-hydroxy propyl) terephthalate (BHPT), or low molecular weight oligomers thereof, with the evolution of propylene glycol and other volatile reaction by-products, the process conducted at atmospheric pressure or above, comprising intimately contacting the bis(3-hydroxy propyl) terephthalate or low molecular weight oligomers thereof in melt form with an inert gas flowing at a velocity of 0.2 to 3 ft/sec, wherein the interfacial area between the melt and the gas phase is at least about 20 $ft^2/ft^3$ of the melt, and removing the volatile reaction by-products with the inert gas wherein the polymerization is completed in less than about 5 hours of contact time while the reactants are maintained in the melt form.

2. The process of claim 1 wherein the inert gas velocity is 0.3 to 1.5 ft/sec.

3. The process of claim 1 wherein the poly(propylene terephthalate) is produced continuously and wherein reactants are fed substantially continuously at one end of the polymerization equipment and product poly(propylene terephthalate) is removed substantially continuously at the other end, the feed and removal being coordinated to be equivalent and intimately contacting the reaction mass with the inert gas, flowing countercurrently to the flow of reaction mass.

4. The process of claim 1 wherein the process is conducted as a batch process and wherein the reactants are intimately contacted with the said inert gas at the said gas velocities until a desired degree of polymerization is achieved.

5. A process for the continuous production of high molecular weight poly(propylene terephthalate), having a DP of at least fiber and film grade from dimethyl terephthalate (DMT) and propylene glycol, the process conducted at about atmospheric pressure or above comprising:

(a) transesterifying DMT with propylene glycol to produce bis(3-hydroxy propyl) terephthalate (BHPT) or its low molecular weight oligomers;

(b) intimately contacting BHPT or its low molecular weight oligomers, in melt form, with an inert gas, flowing in the process countercurrently to the flow of the reaction melt, at a velocity of 0.2 to 3 ft/sec, wherein the contact area is at least about 20 $ft^2/ft^3$ of the melt, the propylene glycol and other reaction by-products are continuously removed and wherein the product poly(propylene terephthlate) is removed continuously while an amount of reaction mass equivalent to less than about 5 hours of the product throughput rate is maintained in the melt form;

(c) recovering propylene glycol, removed in step (b), from the inert gas, for recycle to step (a), and recycling the inert gas back to the system.

6. A process for the continuous production of high molecular weight poly(propylene terephthalate), having a DP at least of fibers and films grade from a terephthalic acid (TPA) and propylene glycol, the process conducted at about atmospheric pressure or above comprising (a) esterifying TPA with propylene glycol to produce bis(3-hydroxy propyl) terephthalate (BHPT) or low molecular weight oligomers thereof;

(b) intimately contacting BHPT or low molecular weight oligomers thereof, in melt form, with an inert gas, flowing in the process countercurrently to the flow of the reaction melt, at a velocity of 0.2 to 3 ft/sec wherein the contact area is at least about 20 $ft^2/ft^3$ of the melt, the propylene glycol and other reaction by-products are continuously removed and wherein the product PPT is removed continuously while an amount of reaction mass equivalent to less than about 5 hours of the product throughput rate is maintained in the melt form;

(c) recovering propylene glycol, removed in step (b), from the inert gas, for recycle to step (a), and recycling the inert gas back to the system.

7. The process of claim 1 wherein the polymerization is conducted in two or more vessels in series, wherein the reaction melt flows from one to the next vessel and a single stream of inert gas is employed which flows in the process countercurrently to the flow of the reaction melt.

8. The process of claim 5 wherein the polymerization is conducted in two or more vessels in series, wherein the reaction melt flows from one to the next vessel and a single stream of inert gas is employed which flows in the process countercurrently to the flow of the reaction melt.

9. The process of claims 6 wherein the polymerization is conducted in two or more vessels in series, wherein the reaction melt flows from one to the next vessel and a single stream of inert gas is employed which flows in the process countercurrently to the flow of the reaction melt.

10. The process of claim 1 wherein the inert gas is selected from $N_2$ and $CO_2$.

11. The process of claim 1 wherein the polymerization is conducted in the presence of a polyester polymerization catalyst to enhance the reaction rate.

12. The process of claim 5 wherein the polymerization is conducted in the presence of a polyester polymerization catalyst to enhance the reaction rate.

13. The process of claim 6 wherein the polymerization is conducted in the presence of a polyester polymerization catalyst to enhance the reaction rate.

14. The process of claim 1 wherein the inert gas is preheated to about polymerization temperature or above polymerization temperature prior to contacting it with the melt.

15. The process of claim 5 wherein the inert gas is preheated to about polymerization temperature or above polymerization temperature prior to contacting it with the melt.

16. The process of claim 6 wherein the inert gas is preheated to about polymerization temperature or above polymerization temperature prior to contacting it with the melt.

17. The process of claim 1 wherein the volatile reaction by-products are recovered and the inert gas is continuously recycled for reuse in the process.

18. The process of claim 5 wherein a single stream of inert gas is recycled through a polymer finishing stage, a polymerization stage and a stage wherein propylene glycol is recovered for reuse in the process.

19. The process of claim 6 wherein a single stream of inert gas is recycled through a polymer finishing stage, a polymerization stage and a stage wherein propylene glycol is recovered for reuse in the process.

20. The process of claim 2 wherein the quantity of the inert gas introduced into the system is sufficient so that the partial pressure of the by-products is maintained at less than the equilibrium pressure of the by-products with the melt.

21. The process of claim 3 wherein the quantity of the inert gas introduced into the system is sufficient so that the partial pressure of the by-products is maintained at less than the equilibrium pressure of the by-products with the melt.

22. The process of claim 5 wherein the inert gas is selected from $N_2$ and $CO_2$.

23. The process of claim 6 wherein the inert gas is selected from $N_2$ and $CO_2$.

24. The process of claim 1 wherein the temperature is about 180° C. to about 250° C.

25. The process of claim 5 wherein the temperature of polymerization step (b) is about 225° C. to about 250° C.

26. The process of claim 6 wherein the temperature of polymerization step (b) is about 225° C. to about 250° C.

* * * * *